(12) United States Patent
Sundaresan et al.

(10) Patent No.: US 8,132,144 B2
(45) Date of Patent: Mar. 6, 2012

(54) AUTOMATIC CLOCK-GATING INSERTION AND PROPAGATION TECHNIQUE

(75) Inventors: Krishnan Sundaresan, Sunnyvale, CA (US); Aravind Oommen, Santa Clara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 315 days.

(21) Appl. No.: 12/486,171

(22) Filed: Jun. 17, 2009

(65) Prior Publication Data

US 2010/0325452 A1 Dec. 23, 2010

(51) Int. Cl.
*G06F 17/50* (2006.01)
*G06F 9/455* (2006.01)

(52) U.S. Cl. ........ 716/133; 716/100; 716/101; 716/103; 716/104; 716/106; 716/107; 716/110; 716/111; 716/132; 716/134; 716/135

(58) Field of Classification Search .......... 716/100–101, 716/103–104, 106–107, 110–111, 132–135
See application file for complete search history.

(56) References Cited

U.S. PATENT DOCUMENTS

| | | | |
|---|---|---|---|
| 6,457,161 B1 * | 9/2002 | Nadeau-Dostie et al. .... | 716/103 |
| 7,117,143 B2 * | 10/2006 | Wang et al. ...................... | 703/25 |
| 7,484,187 B2 * | 1/2009 | Eisner et al. .................. | 716/134 |
| 7,594,200 B2 * | 9/2009 | Eisner et al. .................. | 716/134 |
| 7,676,778 B2 * | 3/2010 | Arbel et al. .................... | 716/134 |
| 7,958,476 B1 * | 6/2011 | Jiang et al. .................... | 716/109 |

OTHER PUBLICATIONS

Jacobson, Hans et al., "Stretching the Limits of Clock-Gating Efficiency in Server-Class Processors", Proceedings of the 11th Int'l Symposium on High-Performance Computer Architecture, 2005.
Power consumption of supercomputers, Online article. URL: http://www.top500.org/lists/2008/06/highlights/power, Jun. 2008, downloaded Jan. 15, 2010, pp. 1-3.
Rabaey, J.M. and Pedram, M. "Low Power Design Methodology", Kluwer, 1996.

* cited by examiner

*Primary Examiner* — Nghia Doan
(74) *Attorney, Agent, or Firm* — Park, Vaughan, Fleming & Dowler LLP (57) ABSTRACT

Embodiments of the present invention provide a method and system for clock-gating a circuit. During operation, the system receives a circuit which includes a plurality of clocked memory elements. Next, the system identifies a feedback path from an output of a clocked memory element to an input of the clocked memory element, wherein the feedback path passes through intervening combinational logic, but does not pass through other clocked memory elements in the circuit. Then, the system gates a clock signal to the clocked memory element so that the clock signal is disabled when the feedback path causes a value which appears at the output of the clocked memory element to be appear at the input of the clocked memory element.

17 Claims, 11 Drawing Sheets

AUTOMATIC CLOCK-GATING INSERTION AND PROPAGATION TECHNIQUE

BACKGROUND

1. Field of the Invention

Embodiments of the present invention facilitate reducing power consumption in integrated circuits. More specifically, embodiments of the present invention facilitate automatically inserting circuitry to provide clock-gating for clocked memory elements in an integrated circuit.

2. Related Art

Advances in semiconductor manufacturing technologies have led to significant increases in microprocessor performance. Unfortunately, as microprocessor clock speeds continue to increase, there is a corresponding increase in the amount of power consumed by the microprocessor. This increase in power consumption increases the amount of heat produced by the microprocessor. As a consequence, energy efficiency is becoming an increasingly important consideration in the design of high-end microprocessor systems.

Dynamic or "switching" power is one type of power which is consumed when circuits switch state in a digital system. This switching power can account for as much as 30% of total power consumption in an integrated circuit. To reduce switching power, some microprocessor designers have implemented "clock-gating" techniques in microprocessor systems. Clock-gating is implemented by adding logic to selectively disable (i.e., turn-off) clock signals for some sequential memory elements. During clock-gating, logic can be added to disable a clock for a sequential element when the element does not change state. Because sequential elements retain their output values when the clock is not switching, the clock can be disabled without affecting the operation of the circuit.

Clock-gating can significantly reduce switching power in a microprocessor. This reduction in switching power can cause a corresponding reduction in the temperature of the microprocessor. Moreover, because sub-threshold leakage currents can vary exponentially with temperature, clock-gating can lead to a significant reduction in leakage currents, which can in turn reduce leakage power.

Clock-gating can be implemented by manually identifying clock-gating opportunities. However, this manual process is tedious and time-consuming, which can limit the manual approach to only a small subset of the sequential elements in the microprocessor circuit. In practice, it is desirable to implement clock-gating with automated tools that can identify clock-gating opportunities and can insert clock-gating logic.

Unfortunately, automated tools fail to identify some clock-gating opportunities. For example, some automated tools operate on a high-level model for the microprocessor (e.g., RTL model) and can fail to identify clock-gating opportunities in the final gate-level netlist. Also, because mapping and logic optimization is performed before clock-gate insertion, automated tools can overlook clock-gating opportunities when enable conditions for some sequential elements change (e.g., as a result of buffering or other optimizations).

Hence, what is needed is a technique for automatically inserting clock-gating logic into a circuit without the above described problems.

SUMMARY

Embodiments of the present invention provide a method and system for clock-gating a circuit. During operation, the system receives a circuit which includes a plurality of clocked memory elements. Next, the system identifies a feedback path from an output of a clocked memory element to an input of the same clocked memory element, wherein the feedback path passes through intervening combinational logic, but does not pass through other clocked memory elements in the circuit. Then, the system gates a clock signal to the clocked memory element so that the clock signal is disabled when the feedback path causes a value, which appears at the output of the clocked memory element, to appear at the input of the clocked memory element.

In some embodiments of the present invention, the feedback path is a recirculating path that passes through a multiplexer that feeds back into the input of the clocked memory element.

In some embodiments of the present invention, recirculating paths are identified and associated memory elements are clock-gated while synthesizing a representation of the circuit. Note that synthesizing the representation of the circuit can involve directing a synthesis tool to map a set of clocked memory elements to a set of mux-flops, which each includes a recirculating multiplexer.

Some embodiments of the present invention identify a set of disabled mux-flops, wherein a select signal for the recirculating multiplexer in each mux-flop is tied to a fixed value. Then, these embodiments remove the identified recirculating multiplexers from the circuit.

In some embodiments of the present invention, synthesizing the representation of the circuit involves synthesizing at least one of a Register Transfer Language (RTL) representation, a gate-level representation, of a mixed representation.

Some embodiments determine if a data input of a downstream clocked memory element is coupled to outputs of one or more upstream clock-gated memory elements. If the one or more upstream clock-gated memory elements are clock-gated by a common signal, some embodiments of the present invention gate a clock signal to the downstream clocked memory element with the common signal.

If the one or more upstream clocked memory elements are clock-gated by two or more signals, some embodiments of the present invention gate a clock signal to the downstream clocked memory element so that the clock signal to the downstream clocked memory element is enabled when any of the clock signals to the upstream memory elements are active.

Some embodiments identify a set of commonly-gated clock-gated memory elements, wherein the clock signal to each commonly-gated clock-gated memory element is gated by a common signal. Next, some of these embodiments cluster the set of commonly-gated clock-gated memory elements into a bank so that the commonly-gated clocked-gated memory elements can share the common signal.

Some embodiments generate at least one of: a netlist file for the circuit, or a report file which identifies the clocked memory elements which are clock gated.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system perform the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field programmable gate arrays (FPGAs), and other programmable-logic devices now known or later developed. When the hardware modules are activated, the hardware modules perform the methods and processes included within the hardware modules.

Terminology

Throughout this description, the terms "circuit" and "design" are used interchangeably to refer to any representation of a circuit. For example, a circuit/design can be a description of a circuit at a high level of abstraction, such as a circuit model in a Hardware Descriptive Language (HDL). Or, a circuit/design can include a gate-level netlist and/or transistor level netlist.

Throughout this description, the term "clocked memory element" refers to any sequential element, i.e. a circuit that can retain a logic value. For example, a clocked memory element can be a flip-flop, a latch, a register, or a memory cell.

Computer System

Figure 1:
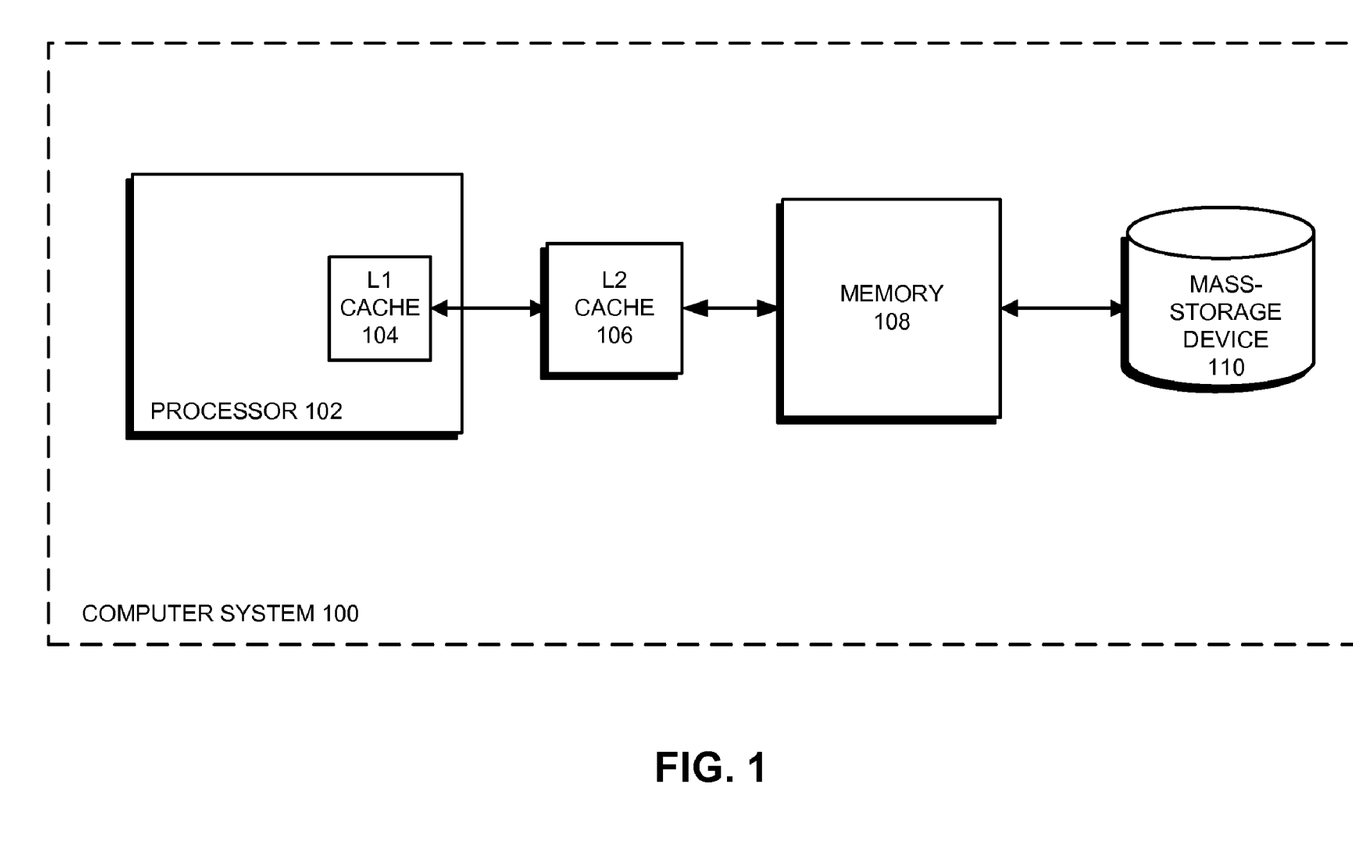
FIG. 1 presents a block diagram of a computer system in accordance with embodiments of the present invention.

FIG. 1 presents a block diagram of a computer system 100 in accordance with embodiments of the present invention. Computer system 100 includes processor 102, L2 cache 106, memory 108, and mass-storage device 110. Processor 102 includes L1 cache 104.

Processor 102 can be a general-purpose processor that performs computational operations. For example, processor 102 can be a central processing unit (CPU) such as a microprocessor, a controller, an application-specific integrated circuit (ASIC), or a field-programmable gate array (FPGA).

Mass-storage device 110, memory 108, L2 cache 106, and L1 cache 104 are computer-readable storage devices that collectively form a memory hierarchy that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments of the present invention, L2 cache 106, memory 108, and mass-storage device 110 are shared between one or more processors in computer system 100. Such memory structures are well-known in the art and are therefore not described in more detail.

Computer system 100 can be incorporated into many different types of electronic devices. For example, computer system 100 can be part of a desktop computer, a laptop computer, a server, an appliance, a piece of testing equipment, a network appliance, or another electronic device.

Although we use specific components to describe computer system 100, in alternative embodiments different components may be present in computer system 100. For example, computer system 100 may not include some of the memory hierarchy (e.g., memory 108 and/or mass-storage device 110). Alternatively, computer system 100 may include video cards, video-capture devices, user-interface devices, network cards, optical drives, and/or other peripheral devices that are coupled to processor 102 using a bus, a network, or another suitable communication channel. Computer system 100 may also include one or more additional processors, wherein the processors share some or all of L2 cache 106, memory 108, and/or mass-storage device 110.

Identifying Feedback Paths

Some embodiments of the present invention identify feedback paths for clocked memory elements. More specifically, some embodiments of the present invention identify a feedback path from an output of a clocked memory element to an input of the same clocked memory element. This feedback path can pass through combinational logic, but does not pass through other clocked memory elements in the circuit.

In embodiments of the present invention, the combinational logic can be associated with one or more signals. The feedback path can be "active" for a set of values for these signals that cause the output of the clocked memory element to appear at the input of the clocked memory element.

A clocked memory element can be clock-gated when a feedback path for the clocked memory element is identified. Specifically, the clocked memory element can be clock-gated when the value at the output of the clocked memory element feeds back to its input. Note that when the feedback path is active, the state of the clocked memory element will not change, because the value at the output of the clocked memory element feeds back to the input. However, when the feedback path is active, the clock signal to the clocked memory element continues to switch. As a result, the clocked memory element consumes switching power even though its state does not change.

Embodiments of the present invention reduce switching power by gating the clock signal to the clocked memory element when the feedback path is active. Gating the clock signal can involve disabling the clock signal when the feedback path is active, so that the clocked memory element retains its previous state. In this way, the state of the circuit is maintained, and switching power is reduced.

Gating the clock signal can involve adding logic to the circuit to disable the clock signal to the clocked memory element. For example, some embodiments of the present invention can add a "clock header" to the circuit to facilitate clock-gating. This clock header receives the clock signal, and outputs a gated clock. To facilitate gating the clock signal, the clock header can include an enable input. This enable input can be used to enable the clock during normal operation, and to disable the clock when the feedback path is active. Clock-headers are discussed in more detail below.

Figure 2A:
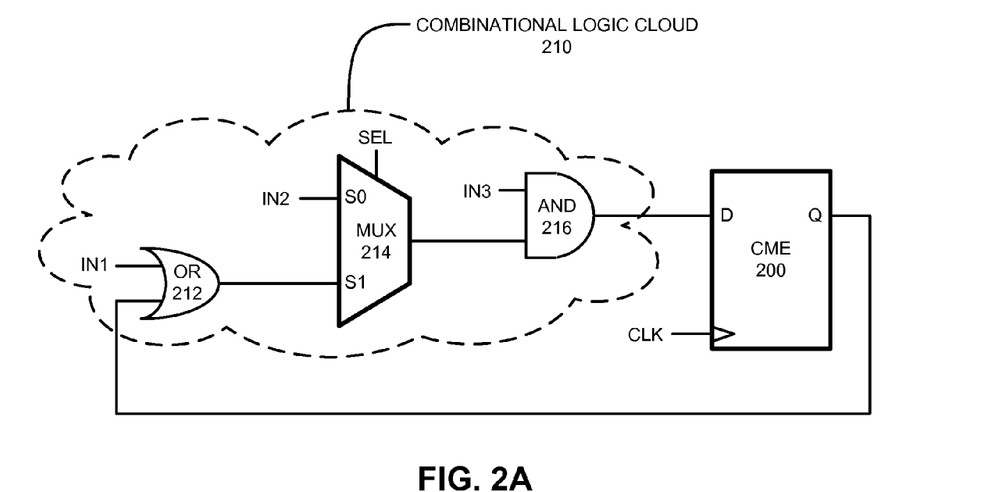
FIG. 2A presents a block diagram of a circuit that includes a feedback path in accordance with embodiments of the present invention.

FIG. 2A presents a block diagram of a circuit that includes a feedback path in accordance with embodiments of the present invention. The circuit includes clocked memory element ("CME") 200 and a combinational logic cloud 210. The feedback path starts at output Q of clocked memory element 200, passes through combinational logic cloud 210, and feeds back to input D of clocked memory element 200. For illustrative purposes, combinational logic cloud 210 includes three combinational logic gates/elements: OR gate 212, AND gate 216, and multiplexer MUX 214. MUX 214 includes select input SEL and outputs the values at inputs S0 or S1 for SEL values 0 and 1, respectively.

With reference still to FIG. 2A, the feedback path for clocked memory element 200 is active when the Boolean expression for the path is true, i.e. when $\overline{IN1}*SEL*IN3=1$, which is equivalent to $IN1+\overline{SEL}+\overline{IN3}=0$ (we use symbol "*" to represent a Boolean AND operation, symbol "+" to represent a Boolean OR, and an overline to represent a Boolean NOT). Hence, the clock signal to clocked memory element 200 can be disabled when the Boolean expression evaluates to true.

Figure 2B:
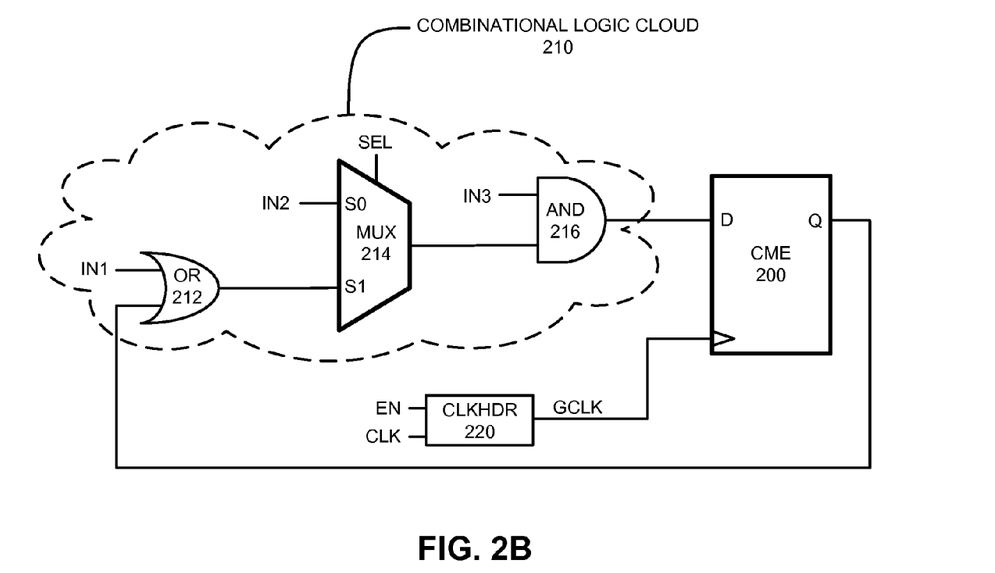
FIG. 2B presents a block diagram of a circuit that includes a clock header for clock-gating, in accordance with embodiments of the present invention.

FIG. 2B presents a block diagram of a circuit that includes a clock header for clock-gating in accordance with embodiments of the present invention. More specifically, FIG. 2B shows the circuit in FIG. 2A, with clock-gating for clocked memory element 200. Note that gated clock ("GCLK") is coupled to the clock input for clocked memory element 200. Clock header ("CLK HDR") 220 includes enable input EN, and can output gated clock GCLK. In the illustrated embodiment, when EN is high, clock header 220 outputs the input clock signal, i.e. GCLK=CLK when EN=1. On the other hand, when EN is low, clock header 220 outputs a constant value, e.g. GCLK=0 when EN=0. In other words, clock header 220 turns-off clock GCLK when enable input EN is low. Note that enable input EN can be connected to a circuit (not shown in FIG. 2B) that outputs a high value when the feedback path is active. In other words, $EN=IN1+\overline{SEL}+\overline{IN3}$.

In other embodiments of the present invention, combinational cloud 210 can include any number and/or arrangement of combinational logic gates/elements. Also, note that in other embodiments of the present invention, the operation of clock header 220 can be reversed with respect to enable input EN so that the clock header disables the clock signal when EN is high. Moreover, in other embodiments of the present invention, clock header 220 can output GCLK=1 when the clock is gated. A person of ordinary skill in the art will readily recognize that a variety of circuits can be used to implement a clock header that disables a clock signal to a clocked memory element.

Clock-Gating with Recirculating Multiplexers

In some embodiments of the present invention, the feedback path for a clocked memory element can be a "recirculating" path that passes through a "recirculating" multiplexer. This recirculating path feeds through the recirculating multiplexer from the output of a clocked memory element back into the input of the clocked memory element. In these embodiments, a select signal for the recirculating multiplexer can "enable" the recirculating path, i.e. a value for the select signal can cause the output of the clocked memory element to appear at the input of the clocked memory element. This recirculating multiplexer facilitates maintaining a previous state for the clocked memory element until the data input for the clocked memory element changes.

Some embodiments of the present invention optimize such circuits with recirculating paths. These embodiments can optimize such circuits by gating the clock to the clocked memory element with the select signal for the recirculating multiplexer. For example, these embodiments can turn-off the clock when the select signal enables the recirculating path.

Some embodiments of the present invention can further optimize the circuit by removing redundant recirculating multiplexers. Specifically, gating the clock signal to the clocked memory element can render the recirculating multiplexer redundant, because, when the clock is turned-off, the clocked memory element can retain a previous state. The recirculating multiplexer can be made redundant by coupling the data input for the recirculating multiplexer to the data input for the clocked memory element. Then, the multiplexer can be removed from the circuit without affecting the operation of the circuit.

Figure 3A:
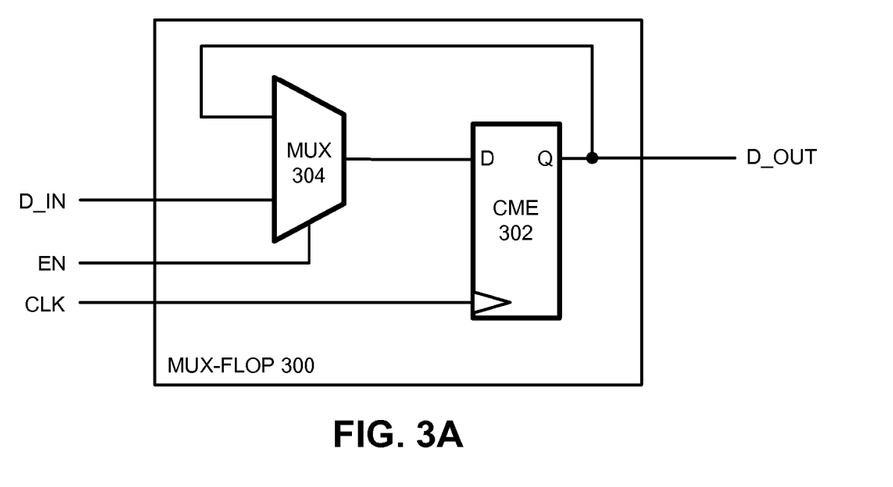
FIG. 3A presents a block diagram of a mux-flop that includes a recirculating multiplexer, in accordance with embodiments of the present invention.

FIG. 3A presents a block diagram of a mux-flop 300 that includes a recirculating multiplexer, in accordance with embodiments of the present invention. Mux-flop 300 includes clocked memory element ("CME") 302 and recirculating multiplexer ("MUX") 304. Mux-flop 300 also includes clock signal CLK, data input D_IN, data output D_OUT, and enable input EN. Enable input EN is coupled to a select signal for multiplexer 304 and can enable the recirculating path for mux-flop 300. Clocked memory element 302 receives clock signal CLK.

Figure 3B:
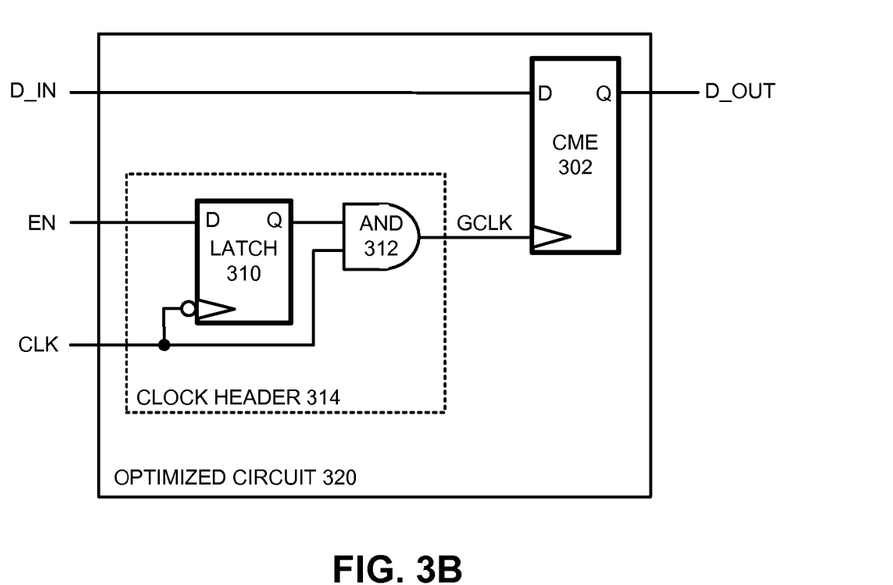
FIG. 3B presents a block diagram of an optimized mux-flop circuit, in accordance with embodiments of the present invention.

FIG. 3B presents a block diagram of an optimized circuit 320, which is an optimized version of mux-flop 300, in accordance with embodiments of the present invention. Optimized circuit 320 includes clock header 314, which can output gated-clock GCLK. Specifically, clock header 314 can gate the clock signal to clocked memory element 302 with signal EN. Data input D_IN is connected to data input D of clocked memory element 302. Note that recirculating multiplexer 304 (from mux-flop 300, see FIG. 3A) is redundant and has been removed. In optimized circuit 320, gated clock GCLK can be deactivated using signal EN.

Clock header 314 includes latch 310 and AND gate 312. Clock header 314 can generate a GCLK synchronous to CLK, even though EN may be asynchronous with respect to CLK. Note that clock header 314 is an exemplary implementation for a clock header. In other embodiments of the present invention, clock header 314 can include more or fewer components, which can be arranged differently.

Clock-Gating Insertion with Dummy-Flops

Embodiments of the present invention can receive a first representation of a circuit and can produce, from the first representation, a second representation of the circuit. These representations can be high-level, low-level, or mixed representations for the circuit. For example, a high-level representation can include a Register Transfer Level (RTL) model, or a representation in a Hardware Descriptive Language (HDL). In contrast, a low-level representation can include a netlist, such as a gate-level, or transistor-level netlist. Mixed representations can include both high-level and low-level representations. Any of these representations can describe the circuit in a modeling language, such as a Verilog, or VHDL.

Some embodiments of the present invention can synthesize a circuit. Synthesizing a circuit can involve using one or more logic synthesis tools, for example "Design Compiler" from Synopsys, Inc., or "RTL Compiler" from Cadence Design Systems, Inc. Generally, logic synthesis can involve receiving a first representation for a circuit and producing a second representation for the circuit. Logic synthesis is generally known in the art and is therefore not described in more detail.

Some embodiments of the present invention can identify recirculating paths and clock-gate associated memory elements while synthesizing a circuit. In these embodiments, recirculating paths can be identified and the associated clocked memory elements can be clock-gated by directing a logic synthesis tool to map clocked memory elements in a design to a set of "dummy-flops." Each clocked memory element can be mapped to a corresponding dummy-flop. A dummy-flop can include a feedback path, which can facilitate identifying candidates for clock-gating. For example, with reference to FIG. 3A, mux-flop 300 can be a dummy-flop.

Identifying clock-gating candidates can involve determining that a signal that enables a recirculating path for a clocked memory element is coupled to a combinational logic cloud. For example, with reference to the mux-flop of FIG. 3A, embodiments of the present invention can identify that a mux-flop can be clock-gated by determining that the EN input for the mux-flop is coupled to a combinational logic cloud.

Note that if the enable signal is tied to a fixed value (such as the power supply voltage, or ground), then the clocked memory element is generally not considered a candidate for clock gating. Some embodiments of the present invention identify a set of disabled mux-flops, wherein a select signal for the recirculating multiplexer in each mux-flop is tied to a fixed value. Then, these embodiments remove the identified recirculating multiplexers from the circuit.

To map clocked memory elements to dummy-flops, some embodiments of the present invention use one or more commands for synthesis tools that force a mapping of a set of clocked memory elements in the circuit to a given clocked memory element. For example, some or all of the clocked memory elements in the circuit can be mapped to corresponding dummy-flops.

Note that the dummy flop can exist as an abstraction, without being an actual cell in a target cell library. In other words, the dummy-flop can exist as a timing, power, and/or logical model. Dummy-flops can also be used in a simplified ("barebones") synthesis flow to facilitate identifying clock-gating candidates from an RTL model, early in the design stage.

Clock-Gating Propagation

Embodiments of the present invention can also propagate clock-gating from upstream clock-gated memory elements to downstream clocked memory elements. Specifically, when the input of a downstream clocked memory element is coupled to outputs of one or more upstream clock-gated memory elements, the downstream clocked memory element can be clock-gated. More specifically, because the input to the downstream clocked memory element will not change when an enable signal turns-off the clock to the upstream clock-gated memory elements, the clock-signal to the downstream clocked memory element can also be turned-off.

Some embodiments of the present invention use a delay element to propagate clock-gating to a downstream clocked memory element. This delay element can receive an input signal and can delay the input signal by one clock cycle. In these embodiments, clock-gating the downstream clocked memory element involves using a delay element to delay the enable signal for the upstream clock-gated memory element. Then, the clock to the downstream clocked memory element can be gated using this delayed version of the enable signal. Circuits that can delay an input signal by one clock cycle are well-known in the art, and are therefore not described in further detail. For example, the delay element can be a latch, or a flip-flop.

Clock-gating can be propagated to a downstream clocked memory element when all of the upstream clock-gated memory elements which generate the input for the downstream clocked memory element are commonly-gated. In this case, clock-gating the downstream clocked memory element can involve gating the clock to the downstream clocked memory element with a delayed version of the same common signal.

Figure 4A:
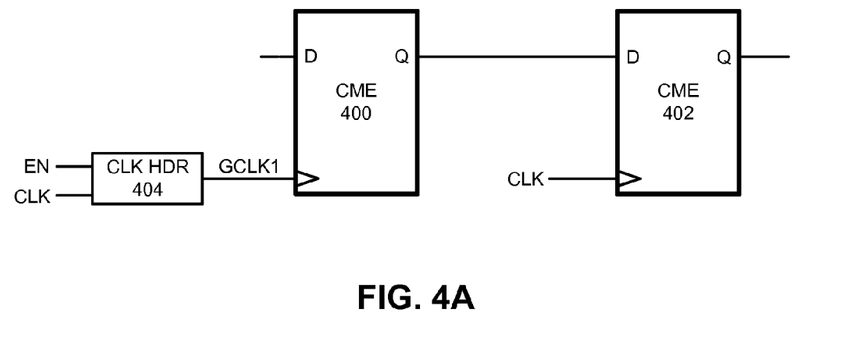
FIG. 4A presents a block diagram of a circuit that includes an upstream clock-gated memory element and a downstream clocked memory element, in accordance with embodiments of the present invention.

FIG. 4A presents a block diagram of a circuit that includes an upstream clock-gated memory element 400 and a downstream clocked memory element 402, in accordance with embodiments of the present invention. In this case, output Q of upstream clock-gated memory element 400 is coupled to input D of downstream clocked memory element 402. Clock header 404 can gate the clock signal to upstream clock-gated memory element 400 with signal EN. Note that when the clock to upstream clock-gated memory element 400 is disabled, the clock to downstream clocked memory element 402 can continue to toggle.

Figure 4B:
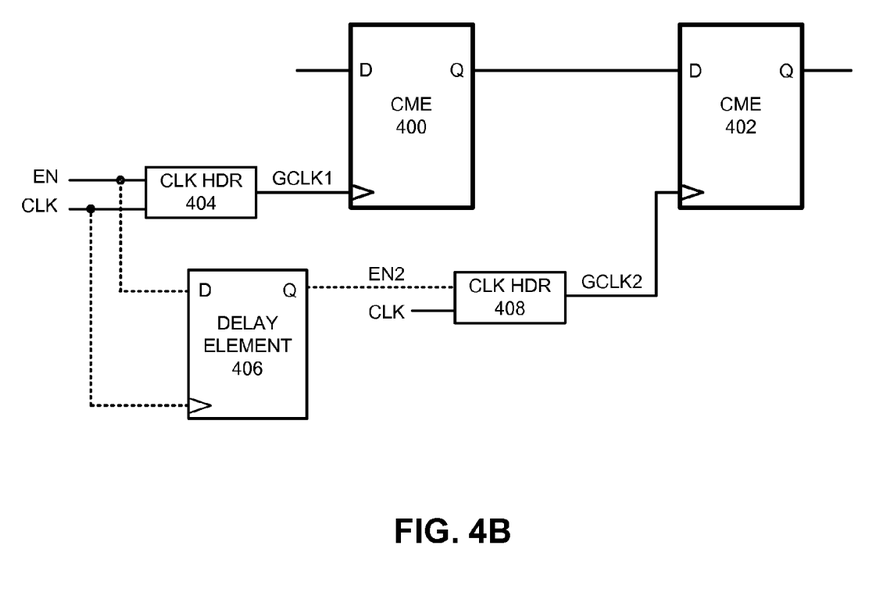
FIG. 4B presents a block diagram of a circuit with clock-gating propagation from an upstream clock-gated memory element in accordance with embodiments of the present invention.

FIG. 4B presents a block diagram of a circuit with clock-gating propagation in accordance with embodiments of the present invention. Specifically, FIG. 4B presents the circuit of FIG. 4A with clock-gating propagation from upstream clock-gated memory element 400 to downstream clocked memory element 402. The clock signal to downstream clocked memory element 402 can be gated so that its clock signal is disabled one clock cycle after the clock signal to upstream clock-gated memory element 400 is disabled.

Delay element 406 receives enable signal EN for upstream clock-gated memory element 400 and generates a delayed enable signal EN2. Clock header 408 receives delayed enable signal EN2 and outputs gated clock GCLK2. Because delayed enable signal EN2 is delayed one clock cycle from enable signal EN, gated clock GCLK2 is turned-off one clock cycle after GCLK1. In other words, the clock to downstream clocked memory element 402 turns-off one clock cycle after the clock to upstream clock-gated memory element 400.

Note that clock-gating can also be propagated if the output of upstream clock-gated memory element 400 is coupled to the input of the downstream clocked-memory element 402 through buffers and/or inverters. Also note that for illustrative purposes, some connections are shown using a dashed line while others are shown using a solid line.

Figure 4C:
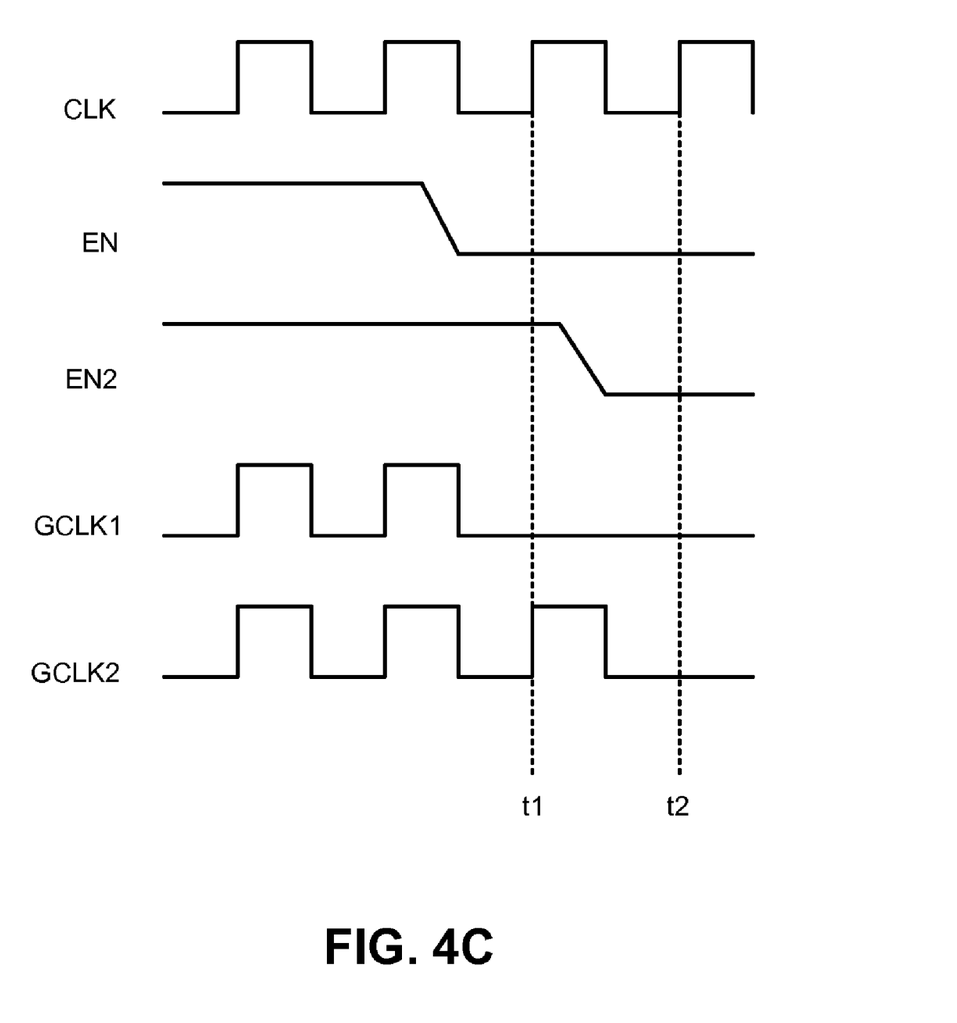
FIG. 4C presents a timing diagram for a delay element in accordance with embodiments of the present invention.

FIG. 4C presents a timing diagram illustrating the relationship between clock CLK, enable signal EN1, delayed enable signal EN2, and gated clocks GCLK1 and GCLK2, in accordance with embodiments of the present invention. In FIG. 4C, enable signal EN2 is delayed by one clock cycle with respect to enable signal EN. Gated clock GCLK1 is turned-off using enable signal EN, and therefore GCLK1 is off at time t1. Gated clock GCLK2 is turned off using enable signal EN2, therefore GCLK2 is off one clock cycle after GCLK1 (at time t2).

Figure 5A:
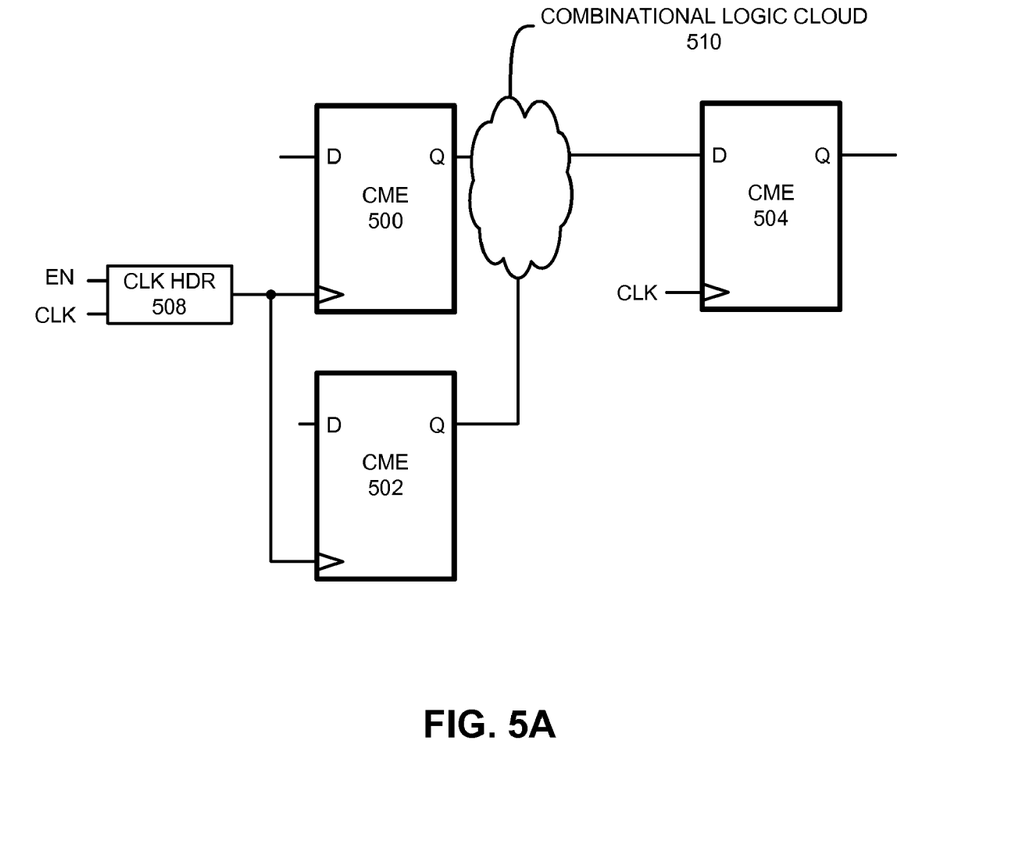
FIG. 5A presents a block diagram of a circuit that includes upstream commonly-gated memory elements and a downstream clocked memory element in accordance with embodiments of the present invention.

FIG. 5A presents a block diagram of a circuit that includes upstream commonly-gated memory elements 500 and 502, and downstream clocked memory element 504 in accordance with embodiments of the present invention. Note that upstream commonly-gated memory elements 500 and 502 are commonly-gated with signal EN. Moreover, the input of downstream clocked memory element 504 is coupled to the outputs of upstream commonly-gated memory elements 500 and 502 through combinational logic cloud 510.

Figure 5B:
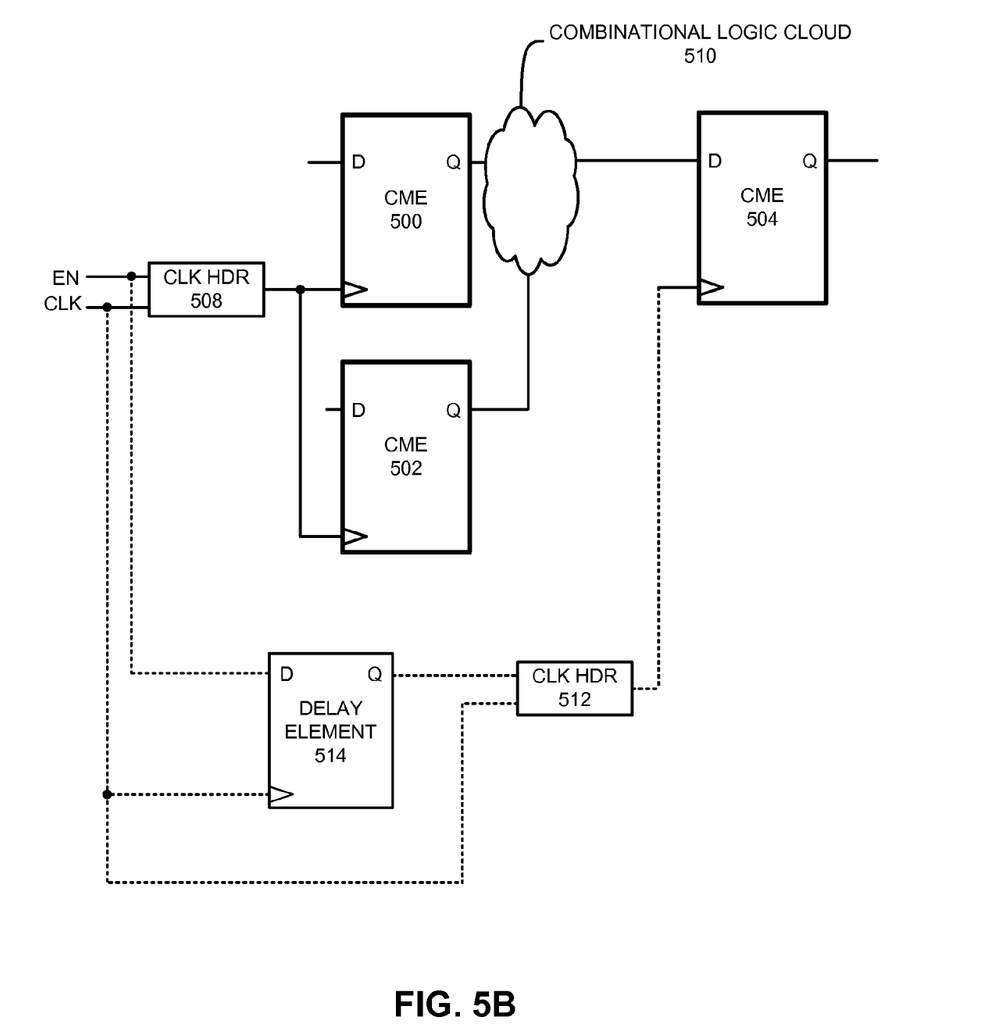
FIG. 5B presents a block diagram of a circuit with clock-gating propagation that includes upstream commonly-gated memory elements, in accordance with embodiments of the present invention.

FIG. 5B presents a block diagram of a circuit with clock-gating propagation that includes upstream commonly-gated memory elements, in accordance with embodiments of the present invention. Specifically, FIG. 5B shows the circuit of FIG. 5A, with clock-gating propagated from upstream commonly-gated memory elements 500 and 502 to downstream clocked memory element 504. Note that the clock signal to downstream clocked memory element 504 can be gated using delay element 514. Delay element 514 receives enable signal EN and generates a delayed enable signal. Clock header 512 receives the delayed enable signal and generates a gated clock for downstream clocked memory element 504.

In embodiments of the present invention, clock gating can also be propagated when the input of a downstream clocked memory element is coupled to outputs of upstream clock-gated memory elements that are clock-gated by two or more signals. In these embodiments, propagating clock-gating to the downstream clocked memory element can involve disabling the clock to the downstream clocked memory element one clock cycle after all clocks to upstream clocked memory elements are disabled. In other words, clock-gating the downstream clocked memory element can involve gating the clock signal to the downstream clocked memory element so that the clock signal is enabled one clock cycle after any of the clock signals to the upstream clock-gated memory elements are enabled.

Propagating clock-gating from upstream clock-gated memory elements that are clock-gated by two or more enable signals can involve combining the two or more enable signals. Specifically, combining the two or more signals can involve performing a Boolean OR of the two or more enable signals, so that the clock signal to the downstream clocked memory element can be enabled one clock cycle after the Boolean OR is true.

Figure 6A:
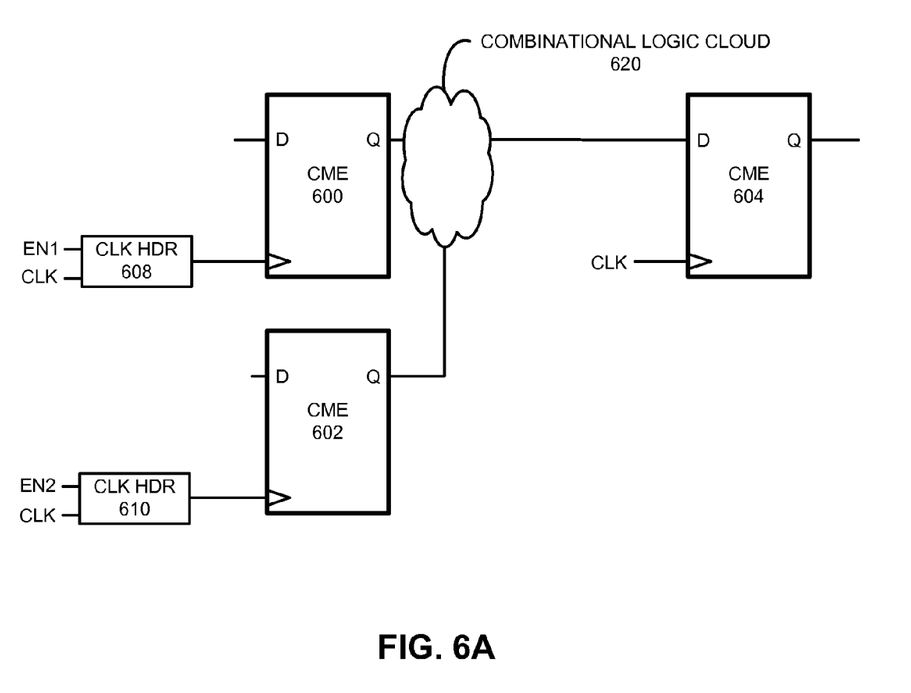
FIG. 6A presents a block diagram of a circuit that includes upstream clock-gated memory elements that are clock-gated by two or more signals, in accordance with embodiments of the present invention.

FIG. 6A presents a block diagram of a circuit that includes upstream clock-gated memory elements that are clock-gated by two or more signals, in accordance with embodiments of the present invention. Specifically, the clock signal to upstream clock-gated memory elements 600 and 602 is gated with signals EN1 and EN2, respectively. The clock signal to upstream clock-gated memory elements 600 and 602 is disabled when EN1=0 and EN2=0, respectively. Moreover, the outputs of upstream clock-gated memory elements 600 and 602 are coupled to the input of downstream clocked memory element 604 through a combinational logic cloud 620.

Figure 6B:
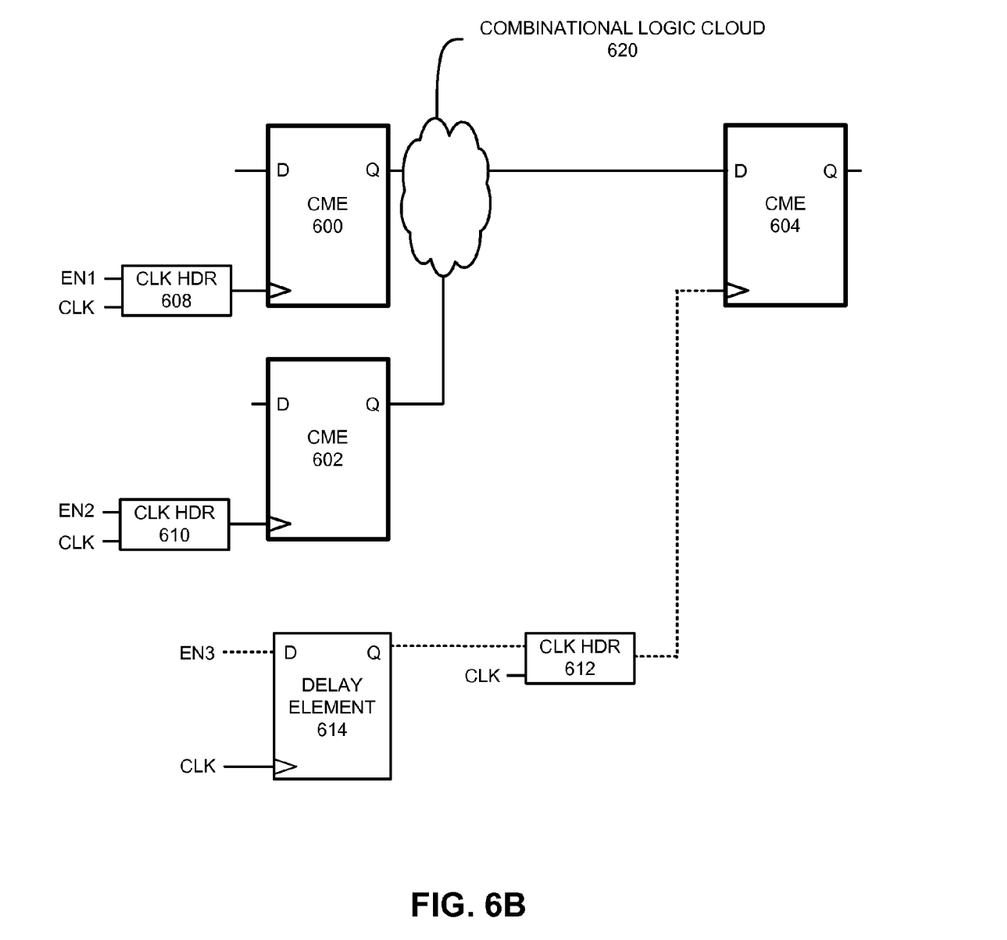
FIG. 6B presents a block diagram of a circuit with clock-gating propagation from upstream clock-gated memory elements that are clock-gated by two enable signals, in accordance with embodiments of the present invention.

FIG. 6B presents a block diagram of a circuit with clock-gating propagation to downstream clocked memory element 604 from upstream clock-gated memory elements 600 and 602 that are clock-gated by two enable signals, in accordance with embodiments of the present invention. Specifically, FIG. 6B shows an optimized version of the circuit of FIG. 6A, in accordance with embodiments of the present invention. In FIG. 6B, the clock signal to downstream clocked memory element 604 is gated with signal EN3, where EN3=EN1+EN2. Enable signal EN3 is delayed by one clock cycle using delay element 614. Clock header 612 receives the delayed enable signal and outputs a gated clock to downstream clocked memory element 604. Hence, the clock signal to downstream clocked memory element 604 can be disabled one clock cycle after the clock signals to both upstream clock-gated memory elements 600 and 602 are disabled, i.e., when EN1=EN2=0.

Note that although we describe embodiments of the present invention that propagate clock-gating from upstream clock-gated memory elements to downstream clocked memory elements, other embodiments of the present invention can propagate clock-gating from downstream clock-gated memory elements to one or more upstream clocked memory elements. Clock-gating propagation from downstream clock-gated memory elements to upstream clocked memory elements operates similarly to the embodiments described above, i.e. upstream-to-downstream clock-gating propagation. Also, in embodiments where clock-gating is propagated from downstream clock-gated memory elements to upstream clocked memory elements, the enable signal to the downstream clock-gated memory element is still delayed by one clock cycle. In other words, in these embodiments the enable signal to the upstream clocked memory elements is provided one clock cycle ahead of the enable signal to the downstream clock-gated memory element.

Clustering Clock-Gated Elements

Some embodiments of the present invention can cluster a set of commonly-gated clock-gated memory elements into a bank. These clock-gated memory elements can be clock-gated by a common signal, or by a buffered and/or inverted version of the same signal.

Clustering commonly-gated memory elements into a commonly-gated bank can facilitate sharing the common signal between the commonly-gated memory elements. For example, clocked memory elements in a commonly-gated bank can share a clock header for the commonly-gated bank. Moreover, clustering the commonly-gated memory elements can involve removing redundant logic from the commonly-gated bank. For example, a single clock header in a bank can replace a clock header for each clock-gated memory element in the bank. Then, redundant clock headers can be removed from the circuit.

In some embodiments of the present invention, identifying commonly-gated clocked memory elements can involve identifying a set of commonly-selected dummy flops, i.e. dummy-flops for which the enable input is coupled to a common signal. These dummy-flops can be clustered if the select signal for the recirculating multiplexer in each dummy-flop is connected to a common signal. When commonly-gated dummy-flops are clustered into a bank, the recirculating multiplexers can be removed from the bank. For example, all the recirculating multiplexers can be removed, and the commonly-gated dummy-flops can be gated with a single clock header.

Method for Clock Gating

Figure 7:
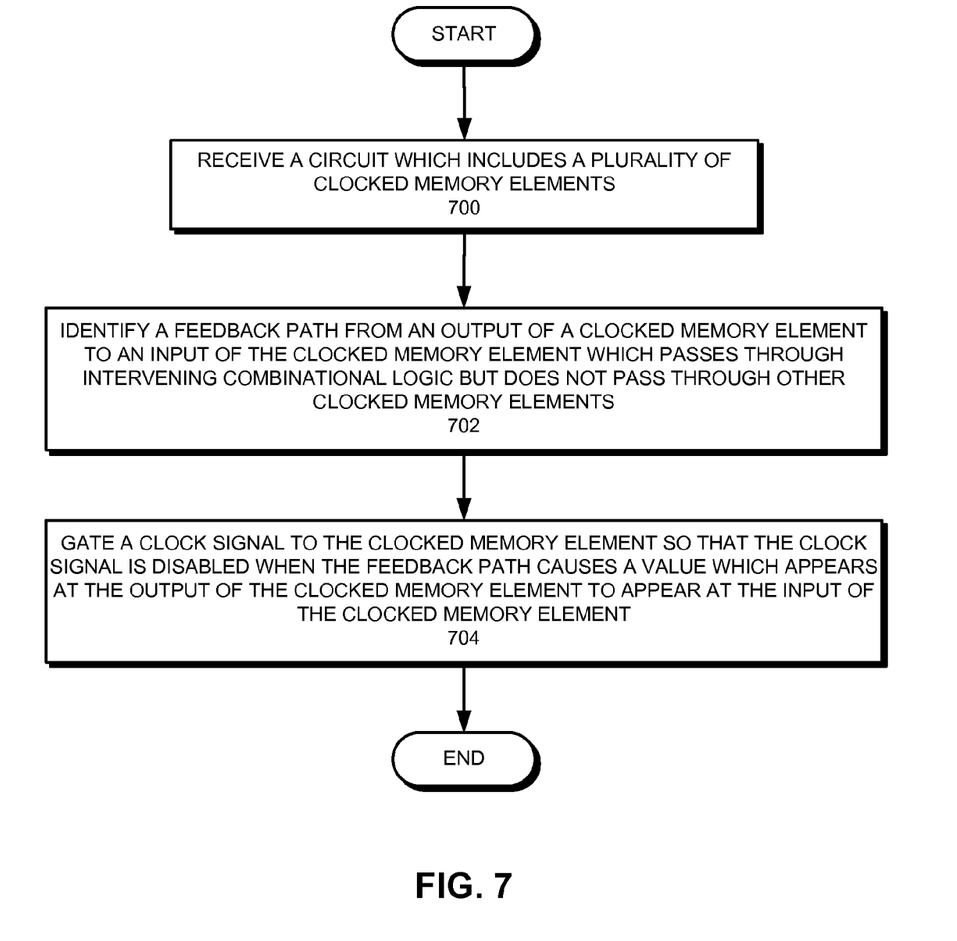
FIG. 7 presents a flow chart illustrating a process for clock gating a circuit in accordance with embodiments of the present invention.

FIG. 7 presents a flow chart illustrating a process for clock gating a circuit in accordance with embodiments of the present invention. The process begins when processor 102 receives a circuit which includes a plurality of clocked memory elements (step 700). Next, processor 102 identifies a feedback path from an output of a clocked memory element to an input of the clocked memory element (step 702). This feedback path passes through intervening combinational logic, but does not pass through other clocked memory elements in the circuit. Then, processor 102 gates a clock signal to the clocked memory element so that the clock signal is disabled when the feedback path causes a value which appears at the output of the clocked memory element to be appear at the input of the clocked memory element (step 704).

Method for Clock Gating Propagation

Figure 8:
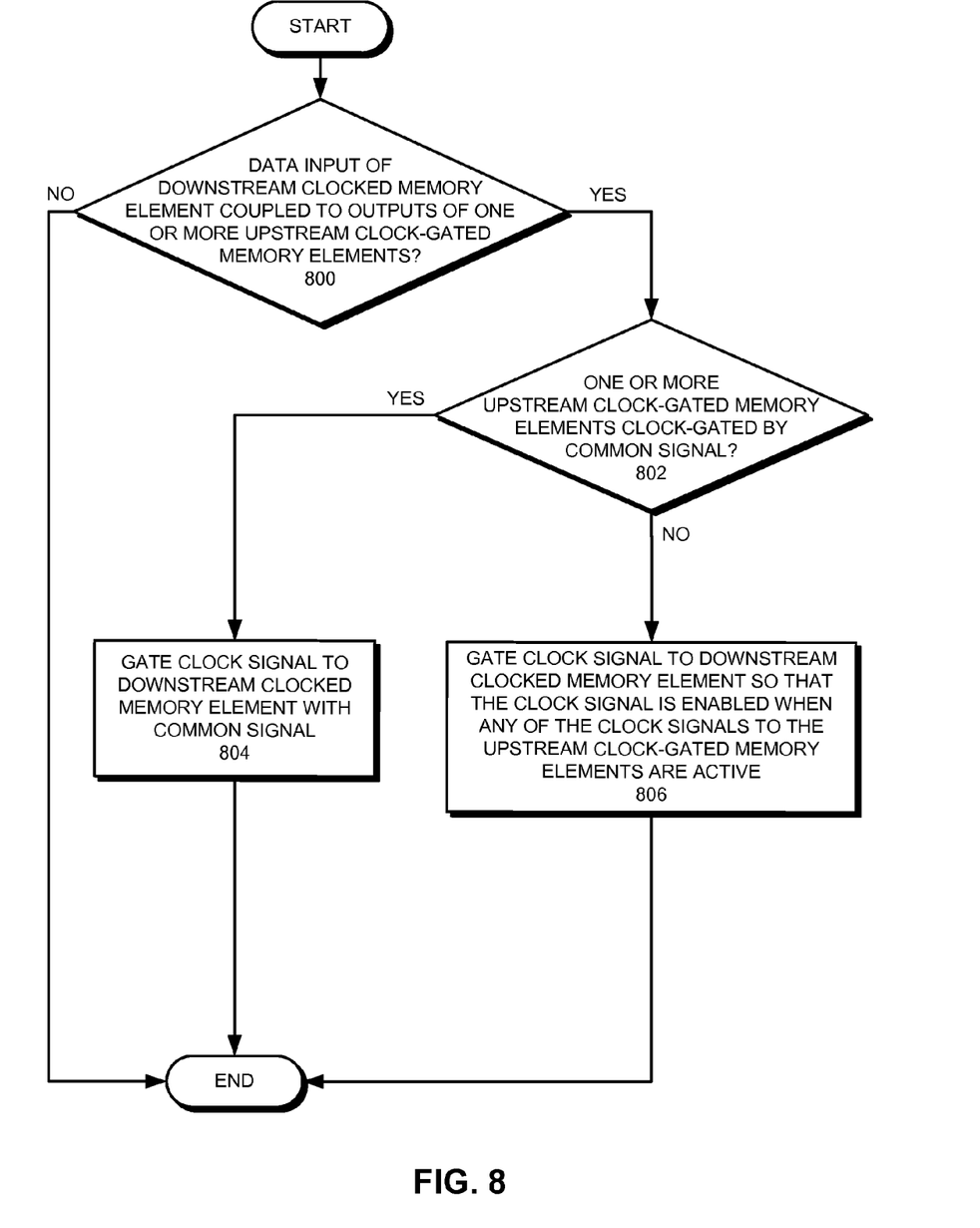
FIG. 8 presents a flow chart illustrating a process for propagating clock gating in accordance with embodiments of the present invention.

FIG. 8 presents a flow chart illustrating a process for propagating clock gating in accordance with embodiments of the present invention. Processor 102 determines if a data input of a downstream clocked memory element is coupled to one or more outputs of upstream clock-gated memory elements (step 800). If the data input of the downstream clocked memory element is not coupled to outputs of one or more upstream clock-gated memory elements (step 800, No), the process ends.

If the data input of the downstream clocked memory element is coupled to outputs of one or more upstream clock-gated memory elements (step 800, Yes), processor 102 determines if the one or more upstream clock-gated memory elements are clock-gated by a common signal (step 802).

If the upstream clock-gated memory elements are clock-gated by a common signal (step 802, Yes), processor 102 gates the clock signal to the downstream clocked memory element with the common signal (step 804). At this point, the process ends.

If the one or more upstream clock-gated memory elements are clock-gated by two or more signals (step 802, No), then processor 102 gates the clock signal to the downstream clocked memory element so that the clock signal to the downstream clocked memory element is enabled when any of the clock signals to the upstream clock-gated memory elements are active (step 806). Then, the process ends.

Note that, as was described above, some embodiments of the present invention propagate clock-gating from downstream clock-gated memory elements to one or more upstream clocked memory elements. In these embodiments, the clock to the upstream clocked memory elements can be turned-off one clock cycle before the clock to the downstream clock-gated memory elements is turned off.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing clock gating for a circuit, comprising, in at least one computer:
receiving the circuit, wherein the circuit includes a plurality of clocked memory elements;
identifying a feedback path from an output of a clocked memory element to an input of the clocked memory element, wherein the feedback path passes through intervening combinational logic, but does not pass through other clocked memory elements in the circuit;
gating a clock signal to the clocked memory element so that the clock signal is disabled when the feedback path causes a value which appears at the output of the clocked memory element to be appear at the input of the clocked memory element; and
determining if a data input of a downstream clocked memory element is coupled to outputs of two or more upstream clock-gated memory elements by passing through intervening combinational logic but not passing through other clocked memory elements in the circuit; and
if the two or more upstream clocked memo elements are clock-gated by one or more signals, gating a clock signal to the downstream clocked memory element so that the clock signal to the downstream clocked memory element is enabled when any of the clock signals to the upstream memory elements are active.

2. The method of claim 1, wherein the feedback path is a recirculating path that passes through a multiplexer that feeds back into the input of the clocked memory element.

3. The method of claim 2, wherein recirculating paths are identified and associated memory elements are clock-gated while synthesizing a representation of the circuit; and
wherein synthesizing the representation of the circuit involves directing a synthesis tool to map a set of clocked memory elements to a set of mux-flops, which each includes a recirculating multiplexer.

4. The method of claim 3, further comprising:
identifying a set of mux-flops with redundant multiplexers, wherein a select signal for the recirculating multiplexer in each mux-flop is coupled to a common signal; and
removing the recirculating multiplexers from the identified mux-flops.

5. The method of claim 3, wherein synthesizing the representation of the circuit involves synthesizing at least one of:
a Register Transfer Language (RTL) representation;
a gate-level representation; or
a mixed representation.

6. The method of claim 1, further comprising:
if the two or more upstream clock-gated memory elements are clock-gated by a common signal, gating a clock signal to the downstream clocked memory element with the common signal.

7. The method of claim 1, further comprising:
identifying a set of commonly-gated clock-gated memory elements, wherein the clock signal to each commonly-gated clock-gated memory element is gated by a common signal; and
clustering the set of commonly-gated clock-gated memory elements into a bank so the commonly-gated clocked-gated memory elements can share the common signal.

8. The method of claim 1, further comprising generating at least one of: a netlist file, or a report file which identifies the clocked memory elements which are clock gated.

9. A non-transitory, computer-readable storage medium storing instructions that when executed by a computer cause the computer to perform a method for providing clock gating for a circuit, the method comprising:
receiving the circuit, wherein the circuit includes a plurality of clocked memory elements;

identifying a feedback path from an output of a clocked memory element to an input of the clocked memory element, wherein the feedback path passes through intervening combinational logic, but does not pass through other clocked memory elements in the circuit;

gating a clock signal to the clocked memory element so that the clock signal is disabled when the feedback path causes a value which appears at the output of the clocked memory element to be appear at the input of the clocked memory element;

determining if a data input of a downstream clocked memory element is coupled to outputs of two or more upstream clock-gated memory elements by passing through intervening combinational logic but not passing through other clocked memory elements in the circuit; and if the two or more upstream clocked memo elements are clock-gated by one or more signals, gating a clock signal to the downstream clocked memory element so that the clock signal to the downstream clocked memory element is enabled when any of the clock signals to the upstream memory elements are active.

10. The computer-readable storage medium of claim 9, wherein the feedback path is a recirculating path that passes through a multiplexer that feeds back into the input of the clocked memory element.

11. The computer-readable storage medium of claim 10, wherein recirculating paths are identified and associated memory elements are clock-gated while synthesizing a representation of the circuit; and wherein synthesizing the representation of the circuit involves directing a synthesis tool to map a set of clocked memory elements to a set of mux-flops, which each includes a recirculating multiplexer.

12. The computer-readable storage medium of claim 11, further comprising:

identifying a set of mux-flops with redundant multiplexers, wherein a select signal for the recirculating multiplexer in each mux-flop is coupled to a common signal; and removing the recirculating multiplexers from the identified mux-flops.

13. The computer-readable storage medium of claim 9, further comprising:

if the two or more upstream clock-gated memory elements are clock-gated by a common signal, gating a clock signal to the downstream clocked memory element with the common signal.

14. The computer-readable storage medium of claim 9, further comprising:

identifying a set of commonly-gated clock-gated memory elements, wherein the clock signal to each commonly-gated clock-gated memory element is gated by a common signal; and clustering the set of commonly-gated clock-gated memory elements into a bank so the commonly-gated clocked-gated memory elements can share the common signal.

15. An apparatus configured to provide clock gating for a circuit, the apparatus comprising:

a receiving mechanism configured to receive the circuit, wherein the circuit includes a plurality of clocked memory elements;

an identification mechanism configured to identify a feedback path from an output of a clocked memory element to an input of the clocked memory element, wherein the feedback path passes through intervening combinational logic, but does not pass through other clocked memory elements in the circuit;

a gating mechanism configured to gate a clock signal to the clocked memory element so that the clock signal is disabled when the feedback path causes a value which appears at the output of the clocked memory element to be appear at the input of the clocked memory element; and a mechanism configured to determine if a data input of a downstream clocked memory element is coupled to outputs of two or more upstream clock-gated memory elements by passing through intervening combinational logic but not passing through other clocked memory elements in the circuit, wherein, if the two or more upstream clocked memory elements are clock-gated by one or more signals, the apparatus is further configured to gate a clock signal to the downstream clocked memory element so that the clock signal to the downstream clocked memory element is enabled when any of the clock signals to the upstream memory elements are active.

16. The apparatus of claim 15, wherein the feedback path is a recirculating path that passes through a multiplexer that feeds back into the input of the clocked memory element.

17. The apparatus of claim 15, further comprising:

wherein, if the two or more upstream clock-gated memory elements are clock-gated by a common signal, the apparatus is further configured to gate a clock signal to the downstream clocked memory element with the common signal.

* * * * *